INVENTOR.
WILBUR L. SHEFFIELD,
By Elmer J. Gorn
ATTY.

Aug. 30, 1949.　　　　W. L. SHEFFIELD　　　　2,480,677
GRID MAKING MACHINE

Filed Dec. 28, 1944　　　　　　　　　　　　　9 Sheets-Sheet 5

INVENTOR.
WILBUR L. SHEFFIELD,
By Elmer J. Gorn
ATTY.

Aug. 30, 1949.  W. L. SHEFFIELD  2,480,677
GRID MAKING MACHINE
Filed Dec. 28, 1944  9 Sheets-Sheet 8

INVENTOR.
WILBUR L. SHEFFIELD,
By Elmer J. Gorn
ATTY.

Aug. 30, 1949.  W. L. SHEFFIELD  2,480,677
GRID MAKING MACHINE
Filed Dec. 28, 1944  9 Sheets-Sheet 9

INVENTOR.
WILBUR L. SHEFFIELD,
By Elmer J. Gorn
ATTY.

Patented Aug. 30, 1949

2,480,677

UNITED STATES PATENT OFFICE 2,480,677

GRID MAKING MACHINE

Wilbur L. Sheffield, Auburndale, Mass., assignor to Raytheon Manufacturing Company, Newton, Mass., a corporation of Delaware Application December 28, 1944, Serial No. 570,510

8 Claims. (Cl. 140—71.5)

This invention relates to a novel grid making machine adapted for the manufacture of the wound-type of grid electrode as used in radio tubes and other types of electrical space discharge devices.

An object of this invention is to devise a machine which has sufficient flexibility of adjustment to enable grids of any desired pitch to be produced by simple adjustments.

Another object is to devise such a machine in which any predetermined number of grid turns may be wound automatically within an accuracy of a small fraction of a single turn.

A further object is to improve and simplify various portions of such a grid machine so as to increase the reliability as well as the flexibility of the machine and to decrease the skill required of an operator in operating the machine.

The foregoing and other objects of this invention will be best understood from the following description of an exemplification thereof, reference being had to the accompanying drawings wherein.

*Side rod supply and spindle structure*

Figures 1, 17, 18:
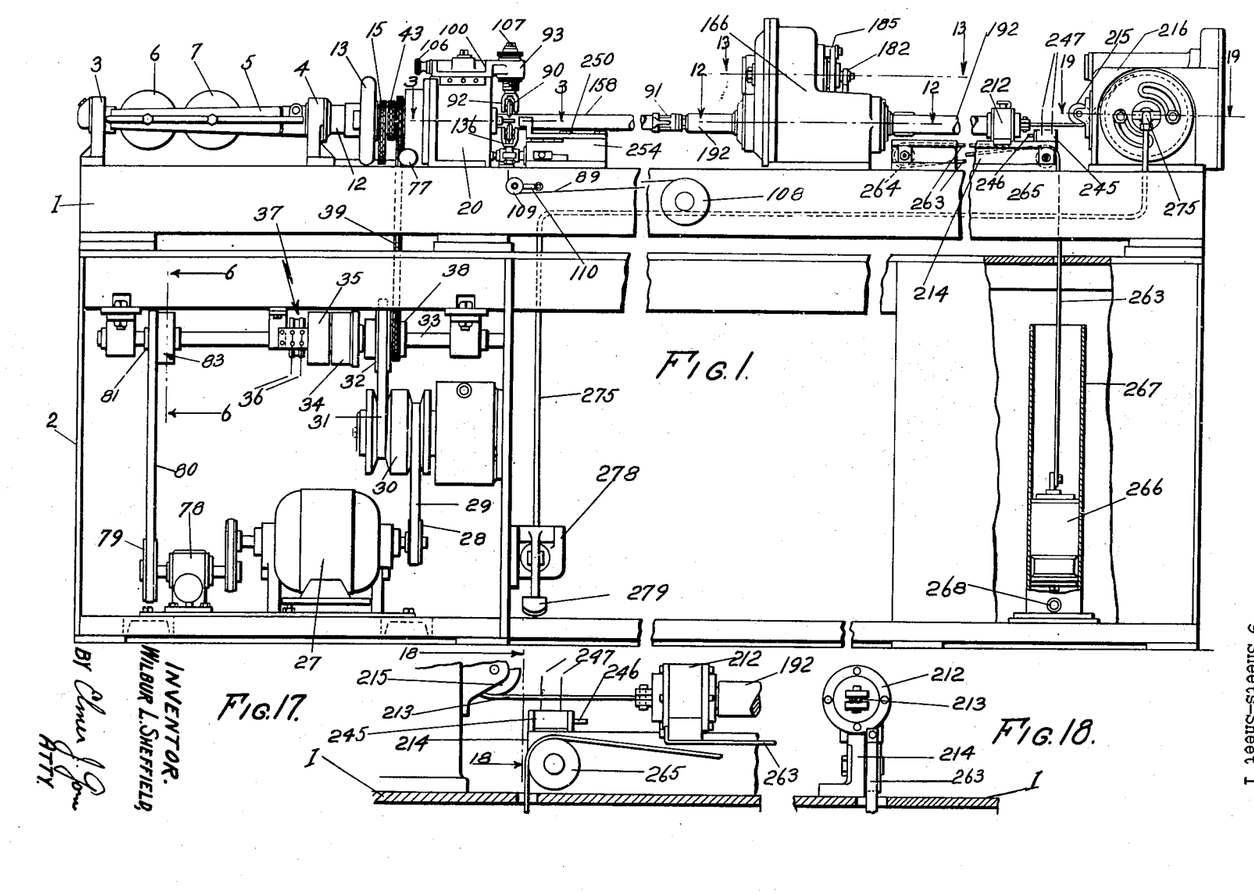
Fig. 1 is a front elevation of the machine.
Fig. 17 is an enlarged side view of the mechanism at the end of the draw shaft as viewed from the rear of Fig. 1.
Fig. 18 is a section taken substantially along line 18—18 of Fig. 17 with the limit switch removed for purposes of clarity.

In the drawings, 1 designates the bed plate of the machine which is supported upon a supporting frame 2. Mounted upon the bed plate 1 is a pair of supporting brackets 3 and 4 which rotatably support by means of suitable bearings the opposite ends of a spool carrying yoke 5. Carried by the yoke 5 is a pair of spools 6 and 7 upon each of which is wound a supply of wire which is to constitute one of the side rods of the grid to be made by the machine. These side rod wires, designated by the numerals 8 and 9, are guided by rollers 10 into the interior of a hollow shaft 11. In order that the proper tension may be exerted on the side rods 8 and 9 during the feed thereof, braking springs 6' and 7' are provided on the yoke 5 to bear frictionally against the hubs of the spools 6 and 7. The rollers 10 are rotatably mounted in a block 10' clamped to the end of said shaft 11. The shaft 11 is rotatably mounted in a bearing 11' carried by the bracket 4. One end of the yoke 5 is likewise clamped to said shaft 11 so as to provide the rotatable support of the yoke 5 by the bracket 4 already mentioned above. As the shaft 11 emerges from the bracket 4 it is keyed to a head coupling sleeve 12 upon which is mounted a hand wheel 13 so that said coupling member 12 and the shafts connected to it may be turned over by hand if desired. The coupling sleeve 12 is also connected to a drive shaft 18 whereby it couples said drive shaft to the hollow shaft 11. The drive shaft 18 carries a counter drive sprocket 14 driving a counter chain 15 which in turn drives a lead counter 16 (Fig. 2), and a total turn counter 17 as more fully described and claimed in my copending application, Serial No. 536,190, filed May 18, 1944, for Driving and counting systems, now Patent No. 2,415,854, dated February 18, 1947.

Figures 4, 7, 16:
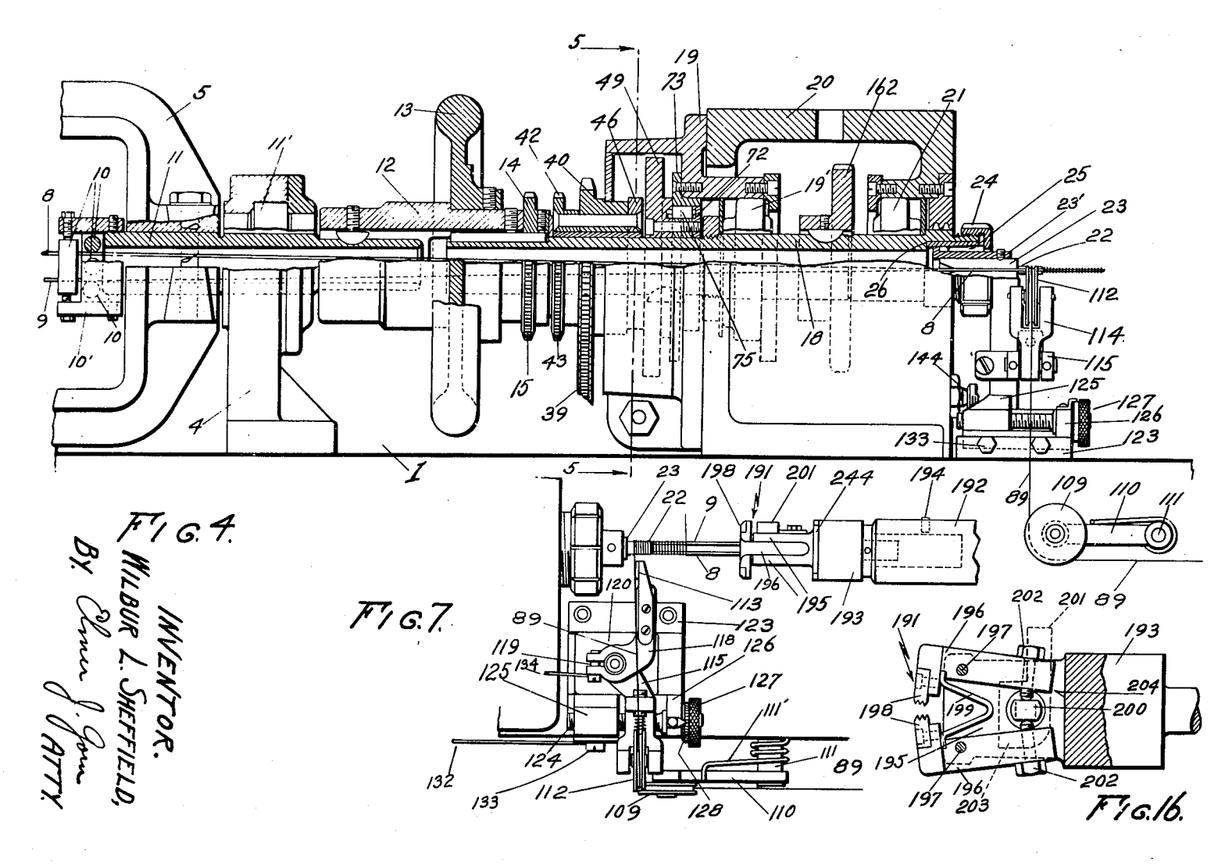
Fig. 4 is an enlarged section through the head casing and adjacent portions taken along line 4—4 of Fig. 2.
Fig. 7 is a top view of the grid wire lead-in and winding arbor mechanism.
Fig. 16 is an enlarged view of the side rod clamping device with portions broken away to disclose underlying parts.

The drive shaft 18 is rotatably mounted in a bearing 19' carried by the face plate 19 of a head casing 20 and also by a bearing 21 carried by the back wall of said head casing (Fig. 4). The head casing is suitably supported on the bed plate 1. The drive shaft 18 is also hollow so as to permit the grid side rods 8 and 9 to pass through it to an arbor 22 formed on the outer end of an arbor shank 23, removably secured in the outer end of the drive shaft 18. The arbor shank is formed with grooves on opposite sides thereof so that the side rods 8 and 9 may extend therethrough and lie along opposite sides of the arbor 22. The arbor shank 23 is held in place by a nut 24 threaded onto the outer end of the drive shaft 18. This nut 24 forces a slotted collet 25 into a tapered bushing 26 thus clamping the collet 25 around a sleeve 23' which is rigidly secured to the arbor block 23. In this way the arbor and arbor block are automatically centered in the end of the shaft 18 and removably yet rigidly secured thereto.

Main drive

In order to drive the mechanism described above, there is provided a driving motor 27 (Fig. 1) mounted upon the supporting frame 2. The motor 27 is provided with a pulley 28 driving a belt 29 which in turn drives an idler pulley 30. The idler pulley drives a belt 31 which in turn engages a pulley 32 journalled on a shaft 33 so as to rotate freely on said shaft unless connected thereto. In order to connect the pulley 32 to the shaft 33, said pulley carries one element 34 of a magnetic clutch, the other element 35 thereof being directly mounted on the shaft 33. The magnetic clutch 34—35 may be energized from a pair of leads 36 connected to a brush and slip-ring arrangement 37 likewise carried by the shaft 33. Also directly fastened to the shaft 33 is a sprocket 38 which drives a chain belt 39 which in turn engages and drives a sprocket 40 (Fig. 4). The sprocket 40 is provided with an interior bushing in which the drive shaft 18 is journalled. In this way the sprocket 40 and the elements connected thereto can rotate freely about the drive shaft 18 unless coupled thereto by a suitable clutch mechanism. Rigidly secured to the sprocket 40 is a sprocket 42 driving a chain 43 which drives a counter reset shaft 44 (Fig. 2) for the counters 16 and 17 so as to reset said counters to zero at the end of a winding operation in accordance with the detailed description as contained in my copending application, Serial No. 536,190, referred to above.

Figure 3:
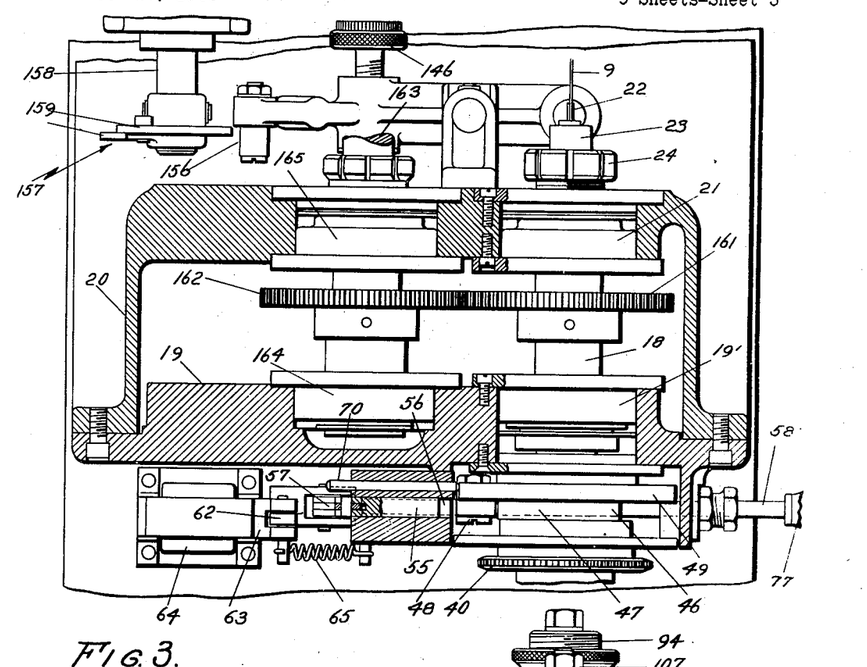
Fig. 3 is an enlarged cross-section of the head casing taken along line 3—3 of Fig. 1.
Figure 5:
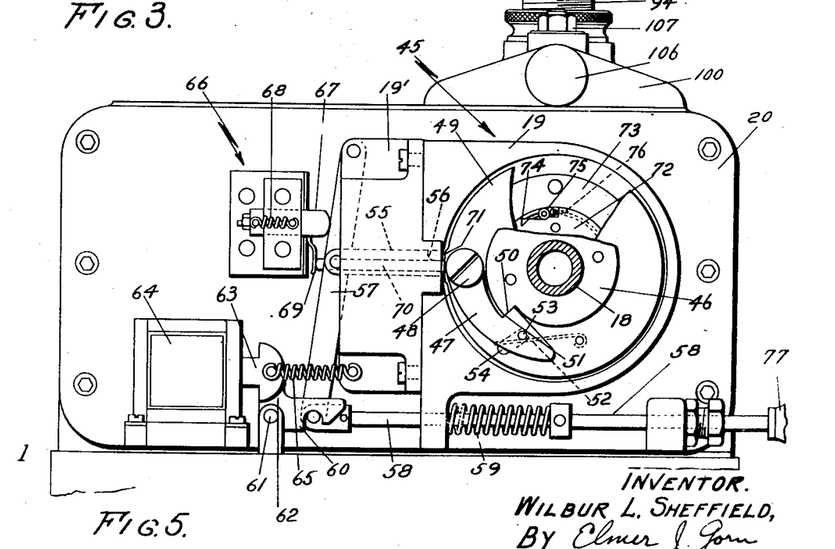
Fig. 5 is a cross-section taken substantially along line 5—5 of Fig. 4.

A clutch generally designated as 45 is provided for causing the sprocket 40 to drive the shaft 18. The details of this clutch are shown in Figs. 3, 4 and 5. Rigidly connected to the sprocket 40 is a cam 46 (Fig. 5) which during the driving period is adapted to engage with a pawl 47 pivoted by a pin 48 to a driving plate 49 fastened to the shaft 18. The cam 46 is provided with a shoulder 50 which during the driving period engages a corresponding shoulder 51 on the pawl 47. A spring 52 fastened to the back face of the driving plate 49 engages a pin 53 which projects through a slot 54 in said plate 49 and is fastened to the pawl 47. In this way the spring 52 biases the pawl 47 toward its position of engagement with the cam 46.

In order to disengage the pawl 47 from the cam 46, there is provided a stop rod 55 having a shoulder 56 which when moved toward the cam 46 engages the nose of the pawl 47, thus moving said pawl out of engagement with the cam 46 and holding said pawl thus disengaged. The stop rod 55 is adapted to be moved into its stop position by a link 57 pivoted at its upper end to a bracket 19' secured to the face plate 19 (Fig. 4) of the head casing 20. Said link 57 is also pivoted in an intermediate point to the stop rod 55. The lower end of the link 57 is pivoted to one end of a clutch-actuating rod 58 which is biased toward its stop position by means of a spring 59. The stop mechanism, including the stop rod 55, is adapted to be held in the running position by means of a latch 60 pivoted at pivot point 61 to the bed plate 1. The latch 60 carries a fulcrum arm 62 pivoted to one end of an armature 63 adapted to be actuated by an electromagnetic coil 64. The armature 63 is adapted to be biased to its outer position by means of a spring 65.

For purposes of control to be described below, there is also associated with the stop mechanism a switch 66 provided with a reset button 67 biased outwardly from the switch by a spring 68. The button 67 is engaged by the link 57 in its running position and thus the spring 68 is prevented from moving the button 67 outwardly from the switch 66. The switch 66 is of a well-known type in which the switch opens if the button 67 is moved outwardly therefrom by the spring 68. In this well-known type of switch, when a spring member 69 is pushed inwardly, the switch 66 recloses, provided that at that time the reset button 67 is also moved inwardly against the action of the biasing spring 68. The spring member 69 is adapted to be actuated by a switch-closing rod 70, which when moved inwardly against the action of the spring member 69 is adapted to reclose the switch 66 providing reset button 67 is held depressed by link 57. The spring member 69 also biases the rod 70 toward the edge of the driving plate 49, and thus the inner end of said rod 70 engages and rides on the edge of said driving plate. The driving plate 49 is provided with a cam projection 71 which is thus adapted to force the rod 70 inwardly against the action of the spring member 69 so as to reclose the switch 66.

It will be noted that when the nose of the pawl 47 engages the shoulder 56 so as to stop the rotation of the shaft 18, the action of the spring 52 exerts a pressure on the pawl 47 tending to rotate it together with its driving plate 49 in a reversed direction. Since it is desirable to stop the shaft 18 in a definite predetermined position without any appreciable reversal of its rotation, there is provided a stop mechanism to prevent such reverse rotation. For this purpose the driving plate 49 is provided with a clutch plate 72 adapted to rotate inside a stop race 73 fixed to the face plate 19 of the casing 20. The clutch plate 72 is provided with one or more cut-away portions 74 each of which receives a roller 75. Each roller 75 is engaged by a spring biased pin 76 tending to move the roller 75 into engagement with the stop race 73. If the driving plate 49 rotates in a counterclockwise direction as viewed in Fig. 5, the rollers 75 are disengaged from the stop race 73 and thus permit the driving plate 49 together with the shaft 18 to rotate freely. If, however, the driving plate 49 tends to rotate in a clockwise direction, the rollers 75 will bind against the stop race 73, prevent such rotation and lock the plate 49 and the shaft 18 in their stopped position. The clutch-actuating rod 58 may be provided with a suitable handle 77 so that the operator may manually reengage the clutch once it has been disengaged under conditions which will be described below.

Figure 6:
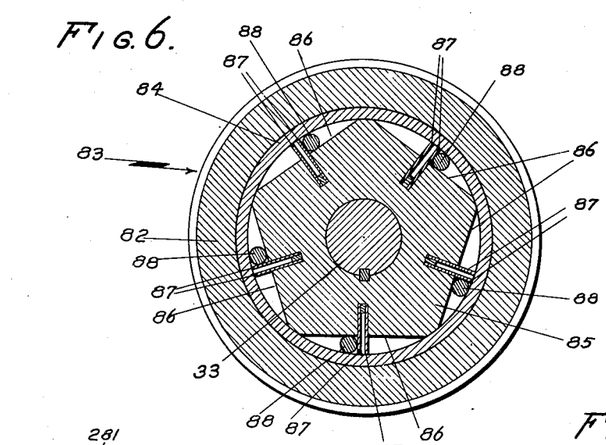
Fig. 6 is a section of an over-running clutch taken along line 6—6 of Fig. 1.

Under certain conditions of operation it is desired that the shaft as well as the counter reset shaft 44 (Fig. 4) be rotated at a reduced speed. For this purpose the motor 27 (Fig. 1) also drives a speed reducing gear mechanism 78, the output pulley 79 of which drives a belt 80. The belt 80 in turn drives a pulley 81 mounted on the casing member 82 of an overrunning clutch 83, the internal structure of which is shown in Fig. 6. The casing member 82 is provided with an outer race 84 within which rotates a clutch inner race 85 fastened to the shaft 33. The edge of the clutch inner race 85 is machined off to provide a plurality of flat surfaces 86 each substantially at right angles to a radial line from the center of said clutch race, each extending completely across its respective portion of said clutch race. At the center of each surface 86 there is provided a spring biased assembly consisting of a pair of leaf springs 87 set into a recess provided in the surface 86. A roller 88 is inserted at one side of each of the spring biased assemblies. Thus, if the casing 82 rotates in a clockwise direction as viewed in Fig. 6, the rollers 88 will bind against the outer race surface 84 and thus drive the clutch inner race 85 and the shaft 33. If, however, an attempt is made to drive the shaft 33 in a clockwise direction as viewed in Fig. 6, the rollers 88 will be disengaged from the race surface 84 and the shaft 33 can rotate freely without driving the casing 82. This overrunning clutch action is obtained so that as long as the magnetic clutch 34—35 is disengaged, the motor 27 will drive the shaft 33 at a low speed and when the magnetic clutch 34—35 is energized, the overrunning clutch 83 permits the motor 27 to drive the shaft 33 at a substantially higher speed through the higher speed idler pulley 30.

In the construction of the overrunning clutch 83 it will be noted that the rollers 88 may be inserted on either side of the biasing springs 87. In some instances it may be desired that the rotation of the entire assembly be reversed. In this case all that is necessary is to remove the face plate from the overrunning clutch 83 and move the rollers 88 from one side to the other of the springs 87. This provides a simple and effective overrunning clutch arrangement capable of providing overrunning clutch action in alternative directions.

*Cutting, winding and swaging mechanism*

Figure 8:
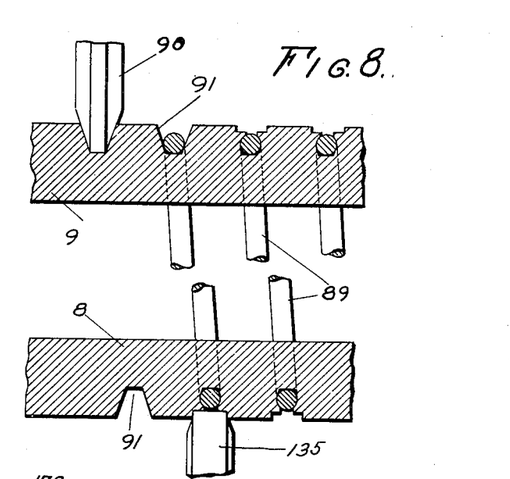
Fig. 8 is an enlarged section through the grid side rods in the process of forming a grid.

As the side rods 8 and 9 pass along the sides of the arbor 22, a grid winding wire 89 is wound thereon and secured to said side rods in order to form the grid. For the purpose of securing the winding wire to the side rods, a cutter disc 90 having a cutting edge forms a plurality of notches 91 in the side rods 8 and 9 as indicated in Fig. 8. As shown more clearly in Figs. 9 and 10, the cutter disc 90 is rotatably supported in a cutter yoke 92 which is carried by and vertically adjustable in a cutter ram 93. In order to support the cutter yoke 92, it is mounted in the lower end of a stud screw 94 and firmly clamped therein by means of a draw bolt 95. The stud screw 94 is adapted to move vertically in the cutter ram 93 and is prevented from rotating therein by means of a key 93' held in notches 95' in the ram 93 and having a portion projecting into a key-way 97 formed longitudinally on the stud screw 94. Said stud screw may be adjusted and retained in its adjusted position by means of a pair of nuts 98 and 99 threaded onto the stud screw 94 and bearing respectively upon the upper and lower surfaces of the ram 93.

As the arbor 22 is rotated by the shaft 18, it carries with it the side rods 8 and 9 and forces them successively against the cutting edge of the cutter 90 so as to form the notches 91 (Fig. 8) in said side rods. The vertical adjustment for the cutter 90, as described above, is provided for the purpose of accommodating any desired diameter of grid structure. The diameter of the grid structure is determined primarily by the size of the arbor 22 which may readily be replaced in the machine due to the arbor supporting mechanism as described above.

The machine is also adapted to produce any desired pitch of the winding on the side rods. In order to form the notches 91 at the proper location with respect to a taper provided on the winding arbor to control the minor diameter of elliptically shaped grids, it is also desirable to adjust the position of the cutter 90 along the machine. For this purpose the ram 93 is carried by a plate 100 formed with two dovetailed portions 101 fitting into a correspondingly formed slide section in the top of the casing 20. In this way the plate 100 is permitted to slide along the top of the casing 20 but is effectively prevented from twisting therein. In order accurately to adjust the position of the plate 100, a stud 102 is mounted in the top of the casing 20 and projects through an elongated slot 103 in the plate 100. An adjusting screw 104 is threaded into the central portion of the stud 102. The adjusting screw 104 is rotatably carried by a plate 105 secured to the back end of the plate 100. The adjusting screw 104 may also be provided with a knurled adjusting head 106 so that by rotation thereof the position of the arm 100 is accurately adjusted on the casing 20. The plate 100 is also adapted to be clamped into position by means of a clamping nut and bolt arrangement 107.

After the notches 91 have been cut into the side rods 8 and 9, the winding wire 89 is laid in these notches and wound around the side rods to form the grid. A supply of the winding wire 89 is carried by a spool 108 rotatably mounted on the side of the bed plate 1. In order to maintain the proper tension on the winding wire 89 during the feed thereof, a braking spring 108' is provided on the bed plate 1 to bear frictionally against the hub of spool 108. As the winding wire 89 comes from the spool 108 it passes under a guide roller 109 rotatably carried by an arm 110 pivoted on a stud 111 (see Fig. 7) which is provided with a spring 111' for biasing the roller 109 downwardly so as to apply a certain amount of tension to said winding wire. After the winding wire 89 leaves the guide roller 109 it passes over a lead-in guide roller 112 and across the face of a lead-in plate 113 which is accurately located so as to guide the winding wire directly into the notches 91 formed by the cutter 90.

Figures 9, 10, 11:
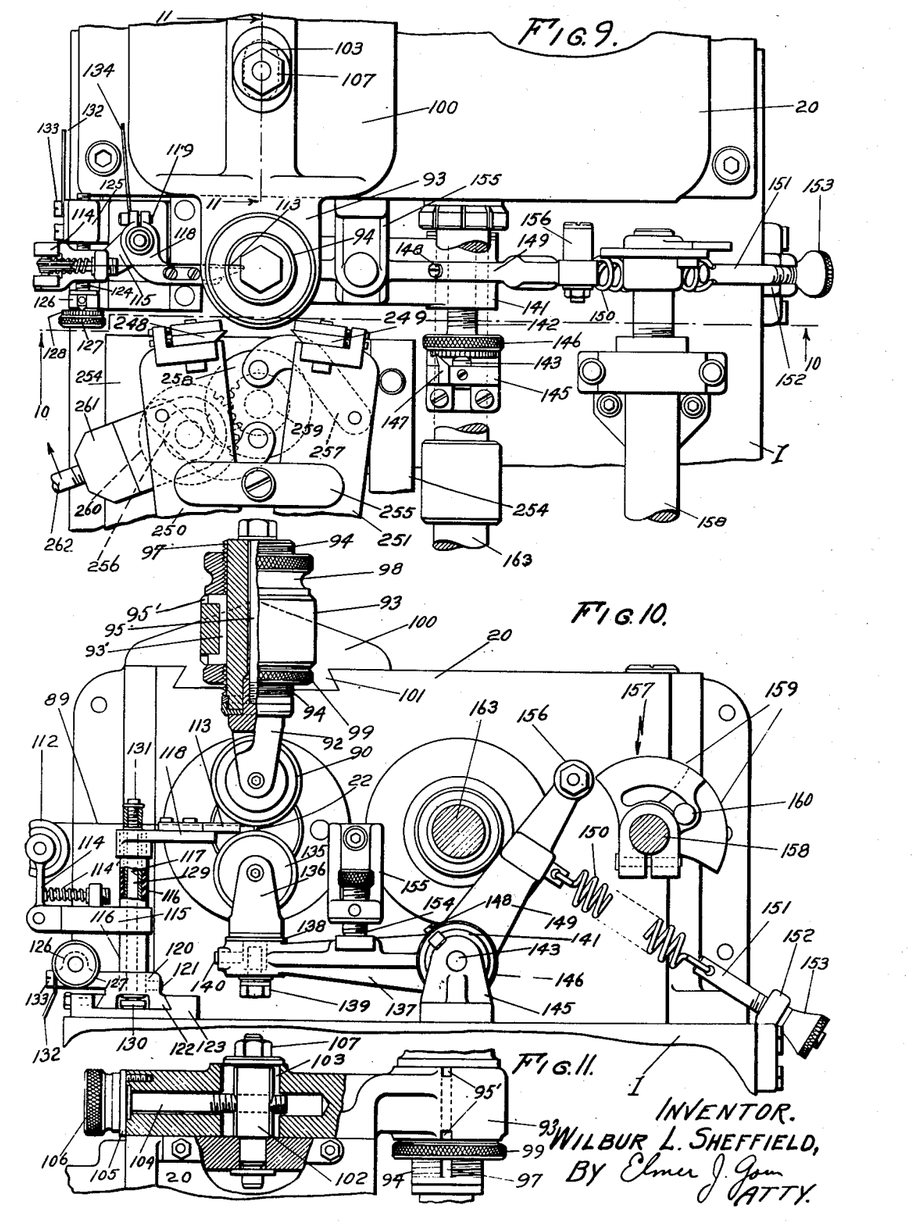
Fig. 9 is a top view of the grid winding mechanism and adjacent portions of the machine.
Fig. 10 is a section taken along line 10—10 of Fig. 9 with certain portions broken away to disclose underlying structure.
Fig. 11 is a partial section taken along line 11—11 of Fig. 9.

The lead-in guide roller 112 is rotatably supported on an arm 114 which is pivoted at the outer end of a bracket 115 which is adjustably clamped around an insulating sleeve 116 (see Fig. 10). The arm 114 may be biased of a biasing spring 114' so as to assist in maintaining proper tension on the winding wire 89. The sleeve 116 is tightly mounted on a standard 117. The lead-in plate 113 is mounted on an arm 118 which is likewise clamped about the insulating sleeve 116. The arm 18 may be placed in any desired orientation about the sleeve 116 by means of a clamping screw 119 which when loosened permits the arm 118 to be rotated about the sleeve 116 and which when clamped rigidly secures said arm in its desired orientation. The adjustment of the bracket 115 is carried out in a similar manner. The clamping of the bracket 115 and the arm 118 on the sleeve 116 assist in retaining said sleeve tight on the standard 117. The standard 117 is screw-threaded into the top of a lead-in carriage 120 and kept from rotating therein by means of a set screw 21. The carriage 120 is provided with a pair of dovetailed sections 122 setting into a correspondingly formed block 123 rigidly secured to the upper surface of the bed plate 1. In this way the carriage 120 can be slid along the block 123 and is prevented from rotating thereon. The position of the carriage may be accurately adjusted by means of an adjusting screw 124 screw-threaded into a projection 125 formed on the block 123. The opposite end of the adjusting screw 124 is rotatably supported by a projection 126 formed on the carriage 120. The adjusting screw 124 may likewise be provided with a knurled adjusting head 127. Since the position at which the winding wire 89 is led in must be accurately predetermined, it is desirable to provide an indicating member 128 mounted on the projection 126 and cooperating with the knurled head 127 to indicate the degree of adjustment of the adjusting screw 124. The carriage 120 may be clamped in its adjusting position by means of a clamping rod 129 projecting through the interior of the standard 117 and having an enlarged head 130, which head forced against the upper surface of the block 123 clamps the carriage 120 into position. In order to accomplish this a clamping screw 131 is threaded into the top of the standard 117 so as to engage the upper end of the rod 129 forcing the head 130 into clamping engagement with the block 123.

In many instances the winding wire 89 is very fine and relatively fragile so that danger of breaking the wire exists. Whenever the wire breaks it is desirable that the machine be stopped as quickly as possible. The arrangement whereby the arms 114 and 118 are insulated from the rest of the machine by the insulating sleeve 116 enables a simple and effective stop arrangement to be produced. For this purpose a conductor 132 is electrically connected to the carriage 120 by a connecting screw 133. Another conductor 134 is connected to the arm 118 by means of the clamping screw 119. If a voltage is connected between the conductors 132 and 134, it will be seen that a circuit is provided from the conductor 134 through the winding wire 89 back to the frame of the machine either through the arbor 22 or through the lead-in roller 109. The frame of the machine of course has the potential of the conductor 132. Thus any breakage of the winding wire 89 will interrupt the circuit and by a relay arrangement to be described below this circuit interruption will stop the operation of the machine.

After the winding wire 89 has been laid in the notches 91, it is swaged in place (see Fig. 8). The side rods 8 and 9 are pulled through the machine by means of a feeding mechanism to be described below. As the side rods advance beyond the position in which the winding wire 89 is laid in the notches 90, said side rods are driven against the edge of a swaging disc 135. In this way the swage 135 forces the metal of the side rods 8 and 9 around the winding wire 89 as indicated in Fig. 8 so as firmly to retain said winding wire in position. The swaging disc 135 is rotatably mounted in a swaging yoke 136 (see Fig. 10) retained in place at the outer end of a lever arm 137. The yoke 136 is supported by a stud screw 138 and retained therein by a draw bolt 139 in a similar manner to that in which the cutter yoke 92 is retained in its stud screw 94. The stud screw 138 is non-rotatably located in the lever arm 137 by means of a set screw 140. The lever arm 137 is mounted at its inner end on an internally threaded hub 141 which receives a threaded shaft 142. The opposite ends of the shaft 142 are rotatably supported by a pair of pivot points 143 and 144 (see Fig. 4). The pivot point 143 is mounted in a pivot bracket 145 and the pivot point 144 is mounted on the rear face of the casing 20. The shaft 142 is provided with a knurled head 146 whereby said shaft may be rotated so as to adjust the position of the hub 141 and its lever arm 137 along the direction of travel of the grid through the machine. This adjustment is for the purpose of enabling the swage to be accurately aligned with the notches 91 for various pitches of grid winding. Since this adjustment must be made very accurately, an indicator 147 is mounted on the bracket 145 and cooperates with a scale on the knurled head 146 so as to accurately indicate the degree of adjustment of the threaded shaft 142. A set screw 148 is provided so as to lock the hub 141 and its lever arm 137 in their adjusted position.

The hub 141 has also secured thereto a bell crank arm 149. A tension spring 150 is connected at one end to the bell crank arm 149 and at the other end to a tension rod 151 which passes through a block 152 mounted on the bed plate 1. The rod 151 is threaded at its outer end upon which is received an adjusting nut 153 bearing against the outer surface of the block 152 whereby the position of the rod 151 may be adjusted to regulate the tension on the spring 150. This tension tends to rotate the lever arm 137 in a clockwise direction as viewed in Fig. 10 so as to urge the swage 135 toward the arbor 22. Since it is desirable for the swaging action to be of a limited depth on the rods 8 and 9, a stop screw 154 mounted in a bracket 155 on the casing 20 engages an intermediate point on the lever arm 137. The stop screw 154 is adjustable so as to regulate the depth of the swaging action. Said adjustment also takes care of varying diameters for the grids which are made upon the machine.

Each individual grid made upon the machine is intended to have a predetermined number of turns of winding wire 89 thereon. The machine is adapted to make a plurality of such grids in a single operation. It is desirable that the above predetermined number of turns for each grid be spaced from each other by a predetermined length of the side rods 8 and 9 and through this predetermined length it is desirable that the winding wire 89 be left loose in the notches 91 and not swaged into place. For this purpose the machine is provided with an arrangement for retracting the swage 135 out of swaging position as said predetermined length of the side rods passes the swage. For the above purpose a roller 156 is secured to the outer end of the bell crank arm 149 in a position to be engaged by a cam 157 mounted upon a cam shaft 158. The cam shaft 157 is provided with circular cam surfaces 159 which are adapted to engage the roller 156 and thereby move the bell crank arm 149 against the action of the spring 150 so as to rotate the lever arm 137 about its pivot points 143 and 144 to a sufficient extent to move the swage 135 out of swaging engagement with the side rods 8 and 9. The cam 157 and its cam surfaces 159 are made in two relatively adjustable parts which may be clamped in adjusted position by means of a clamping bolt 160. In this way the period of time during which the swage 135 is thus retracted during each rotation of the cam shaft 158 may be adjusted.

Figure 13:
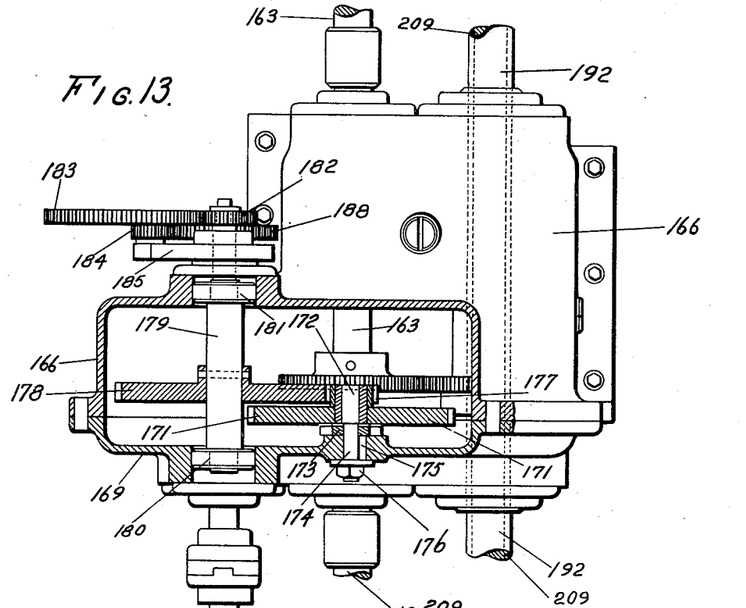
Fig. 13 is an enlarged section of an upper portion of said central casing taken along line 13—13 of Fig. 1.
Figure 14:
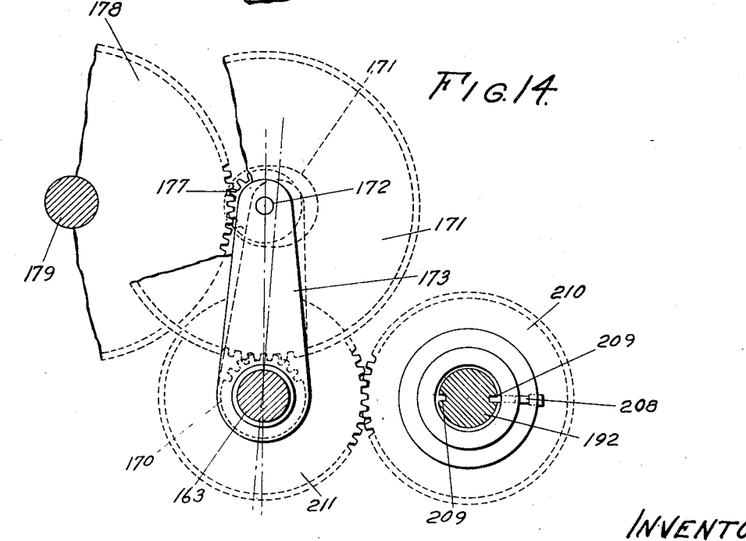
Fig. 14 is a view of a releasable gear arrangement within the central casing for disengaging the cam shaft from the jack shaft.

The cam shaft 158 is driven in synchronism with the arbor 22 although in various predetermined speed relationships therewith. For this purpose the drive shaft 18 carries a gear 161 (see Fig. 3) which meshes with a corresponding gear 162 carried by a jack shaft 163. This jack shaft is mounted in suitable bearings 164 and 165 carried respectively by the face plate 19 and the rear wall of the casing 20. The jack shaft 163 extends from the head casing 20 through a central casing 166 and is received in suitable bearings 167 and 168 (see Fig. 12) carried respectively by the face plate 169 and the rear wall of said casing 166. Within the casing 166 the jack shaft 163 drives the cam shaft 158 through a releasable gear arrangement, the action of which is shown more clearly in Fig. 14. This releasable gear arrangement consists of a pinion gear 170 carried by the jack shaft 163 and meshing with a larger gear 171 mounted on a pivot 172 carried at the outer end of a pivot arm 173. The pivot arm 173 is rotatably mounted on the jack shaft 163 and is adjustable within a limited arc around said jack shaft by means of a threaded extension 174 (see Fig. 13) which projects through a slot 175 in the face plate 169 and is clamped in its adjusted position by means of a clamping nut arrangement 176. Also secured to the large gear 171 is a release pinion 177 which in the full line position of adjustment as illustrated in Fig. 14 engages with a cam gear 178 mounted upon and driving an intermediate cam shaft 179. The intermediate cam shaft 179 is suitably mounted in bearings 180 and 181 mounted respectively in the face plate 169 and the rear wall of casing 166 (see Fig. 13). Thus when the releasable gear arrangement is in the full line position of Fig. 14, the jack shaft 163 drives the intermediate gear shaft 179. When, however, the clamping nut 176 is released and the gear arrangement of Fig. 14 is moved to the dotted line position, the jack shaft 163 is released from and no longer drives the intermediate cam shaft 179. As will be pointed out below, the intermediate cam shaft 179 drives the main cam shaft 158 and thus releasing the jack shaft 163 from the intermediate cam shaft 179 interrupts the drive of the cam shaft 158. Under these latter conditions, the cam shaft 158 remains stationary substantially in the position as indicated in Fig. 10 and all of the turns of the winding wire 89 are swaged to the side rods 8 and 9 throughout the operation of the machine.

Figures 2, 15, 21:
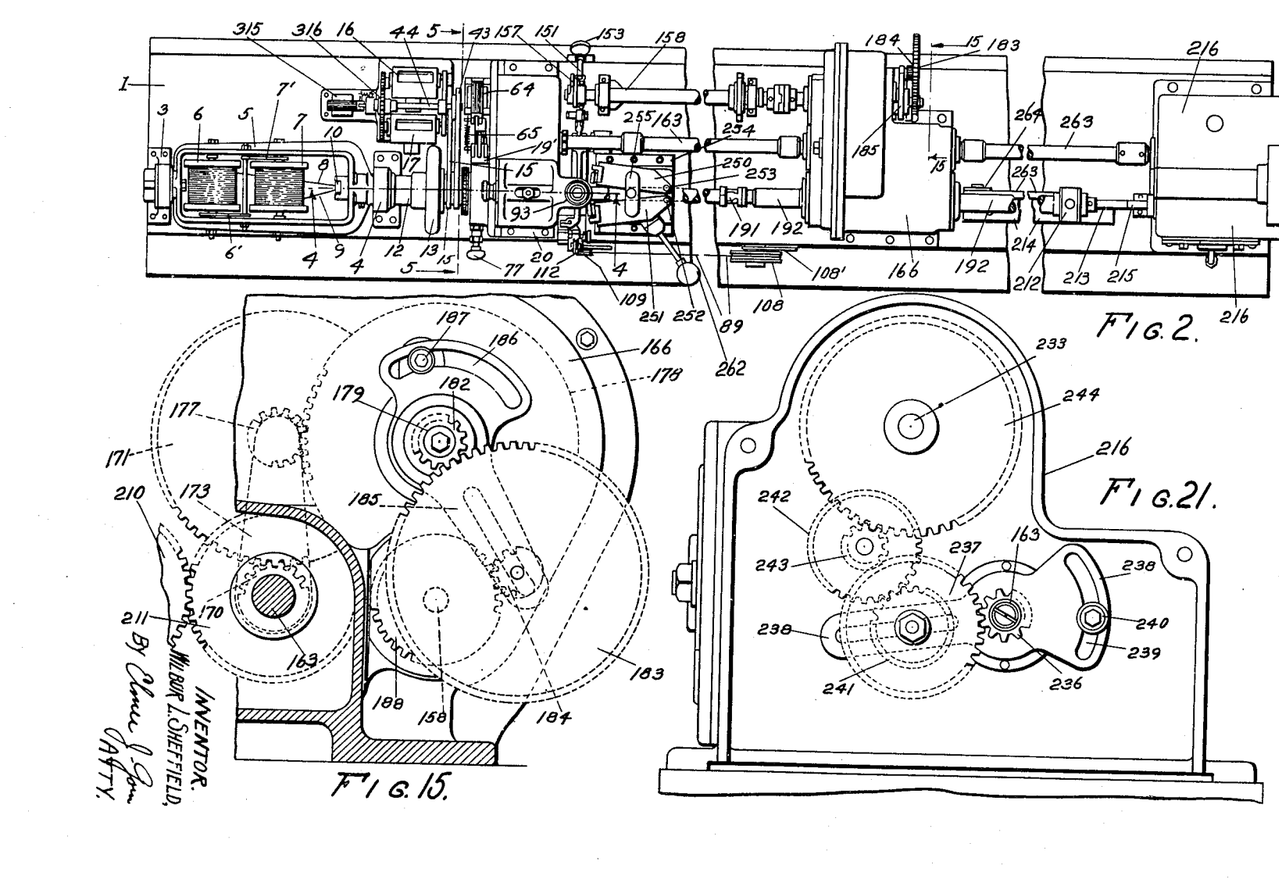
Fig. 2 is a top view of the machine as shown in Fig. 1.
Fig. 15 is an enlarged cross-section taken substantially along line 15—15 of Fig. 2 showing a change speed arrangement for the swage cam shaft.
Fig. 21 is an end view of the end casing as viewed from the right of Fig. 1 showing the change gear arrangement for the grid pullout drive.
Figure 12:
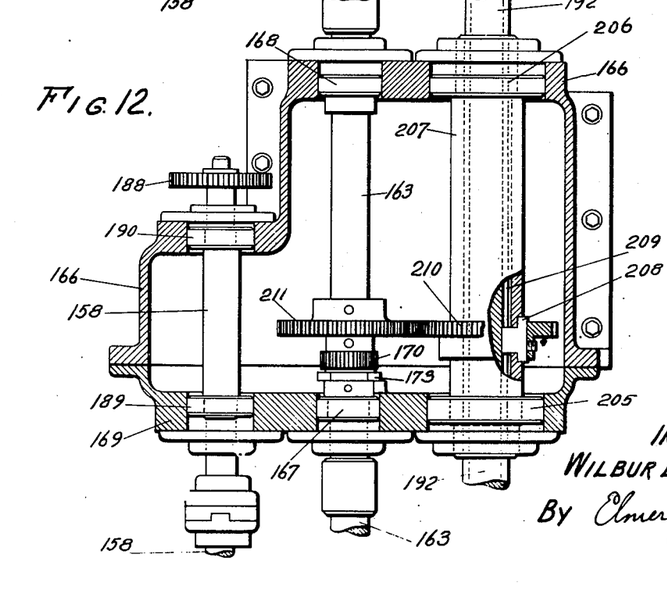
Fig. 12 is an enlarged cross-section of the central casing taken along line 12—12 of Fig. 1.

The intermediate cam shaft 179 projects from the rear face of the casing 166 and carries a pinion gear 182 forming part of a change speed arrangement as illustrated more clearly in Fig. 15. The pinion 182 meshes with a change gear 183 secured to a change gear pinion 184, both of which are rotatably and releasably mounted on a segment arm 185 rotatably mounted around the intermediate cam shaft 179. The segment arm 185 is held in any desired orientation around said shaft 179 within a predetermined arc by means of a slot 186 and a cooperating clamping nut arrangement 187. The change gear pinion 184 meshes with a cam drive gear 188 which is secured to and drives the cam shaft 158. The cam shaft is rotatably mounted in bearings 189 and 190 carried, respectively, by the face plate 169 and the rear wall of the casing 166 (Fig. 12).

The above change speed arrangement permits a large number of definite speed relationships to be established between the rotation of the arbor 22 and the retraction of the swage 135 merely by substituting various sizes of change gear 183 and change gear pinion 184 in the above gear train (Fig. 15). Due to the positive gear drive the movement of the swage 135 is synchronized with the movement of the arbor 22 and also substantially any desired combination of swaged and unswaged turns may be secured along the side rods 8 and 9.

*Pull feed mechanism*

In order to feed the side rods 8 and 9 at the desired rate through the machine, there is provided a novel pull-out feed mechanism. This mechanism includes a clamp 191 which seizes the ends of the side rods 8 and 9 as said side rods come from the grid-forming position. The clamp 191 is mounted at the outer end of a draw shaft 192. The detailed structure of the clamp 191 is shown most clearly in Figs. 7 and 16. The clamp consists of a block 193 retained in place in the end of the draw shaft 192 by means of a set screw 194. The block 193 is formed with a pair of projecting side arms 195 between which is pivoted a pair of clamping levers 196 pivoted at points 197 near the outer ends of the side arms 195. The clamping levers 196 are provided at their outer ends with a pair of clamping jaws 198. A spring 199 tends to bias said jaws to their opened position. A clamping cam member 200 is rotatably mounted in the side arms 195 between the inner ends of the clamping levers 196. Upon rotation of the cam 200 by means of a clamping link 201, said cam forces the inner ends of the levers 196 apart and thus clamps the jaws 198 onto the side rods 8 and 9. This clamping action may be adjusted for various sizes of side rods 8 and 9 by adjusting bolts 202 carried by the levers 196 and bearing at their inner ends upon the cam 200. The rear surface 203 of the link 201 is adapted in its locking position to engage against a locking surface 204 on the block 193 so as to retain the clamp in its clamping position.

In order to prevent any twisting of the side rods 8 and 9, the draw shaft 192 is rotated in exact synchronism with the arbor 22. For this purpose the shaft 192 extends through the casing 166 and is journalled therein by suitable bearings 205 and 206 carried, respectively, by the face plate 169 and the rear wall of said casing 166, as shown in Fig. 12. The shaft 192 is free to rotate in said bearings, as well as to slide longitudinally therethrough. Also carried by the bearings 205 and 206 and mounted around the shaft 192 is a driving sleeve 207. The draw shaft 192 is likewise free to slide through said sleeve 207, but is non-rotatably connected thereto by means of a key 208 fastened to the sleeve 207 and projecting into an elongated keyway 209 formed on the draw shaft 192. The sleeve 207 is driven directly from the jack-shaft 163 by means of a pair of gears 210 and 211 carried, respectively, by the sleeve 207 and the jack-shaft 163. The gearing 161—162 (Fig. 3) between the drive shaft 18 and the jack-shaft 163 constitutes a one-to-one speed relationship as does the gearing 210—211 (Fig. 12) between the jack-shaft 163 and the sleeve 207. Thus it will be seen that the draw shaft 192 is driven in absolute synchronism with the arbor 22 thereby avoiding any possibility of twisting the side rods 8 and 9.

As the draw shaft 192 extends beyond the center casing 166 it terminates in a draw head 212 to which is secured a steel draw tape 213 for the purpose of pulling the shaft 192 along the machine at the desired rate. As shown, most clearly in Figs. 17 and 18, the outer end of the draw shaft 192 is steadied by having the draw head 212 ride upon a track member 214 secured to the bed plate 1. The draw head 212 is provided internally with a suitable bearing structure so that the draw shaft 192 may rotate freely within said draw head, but nevertheless be firmly retained against any relative longitudinal motion with respect thereto.

Figure 19:
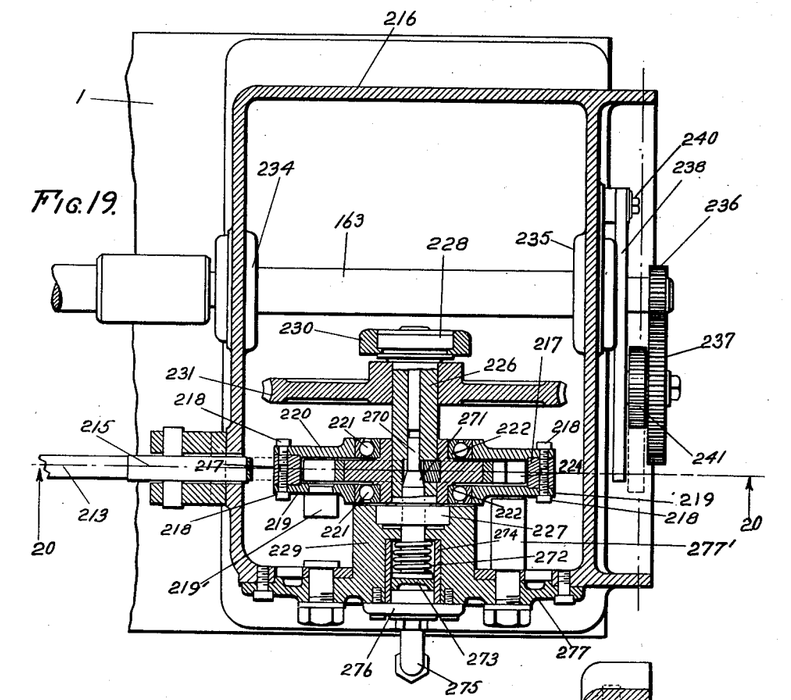
Fig. 19 is a cross-section through the end casing taken substantially along line 19—19 of Fig. 1.
Figure 20:
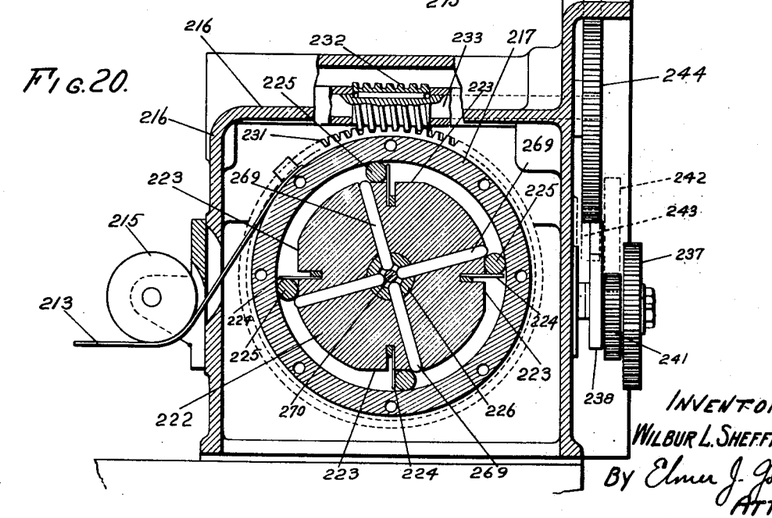
Fig. 20 is a section of said end casing taken substantially along line 20—20 of Fig. 19.

The draw tape 213 passes over a guide roller 215 into the interior of a draw casing 216 (Figs. 19–20) where the outer end of said tape is secured to the outer surface of a ring 217. This ring which is of a simple circular shape is securely fastened by means of bolts 218 between two plates 219 and 220 rotatably mounted by means of ball-bearings 221 around an inner clutch disc 222. The inner surface of the ring 217 is adapted to cooperate as an outer clutch race with said clutch disc 222. The edge of the clutch disc 222 is machined off to provide a plurality of flat surfaces 223 each substantially at right angles to the radius of said clutch disc and each extending completely across its respective portion of said clutch disc. At the center of each surface 223 there is provided a leaf-spring 224 set into a recess provided in the surface 223. A roller 225 is inserted on one side of each of said leaf-springs. Thus, normally when the clutch disc 222 tends to rotate in a clockwise direction, as viewed in Fig. 20, the rollers 225 will bind against the inner surface of the ring 217 and thus drive said ring 217 in a clockwise direction. This will cause the steel tape 213 to be pulled by the ring 217, thus winding it upon the surface of said ring and pulling the draw rod 192 along the machine at a rate dependent upon the peripheral speed of the ring 217.

In order to drive the clutch disc 222 in said clockwise direction, said disc is rigidly secured to a shaft 226 rotatably supported in bearings 227 and 228 mounted respectively in blocks 229 and 230 carried by the draw casing 216. Mounted upon the shaft 226 is a worm gear 231 adapted to be driven by a worm 232 carried by a shaft 233 journalled in the upper portion of the casing 216.

The jack-shaft 163, which also extends from the central casing 166 into the draw casing 216, is also adapted to drive the shaft 233 through a suitable speed change gearing arrangement. This speed change arrangement is shown most clearly in Figs. 19, 20 and 21. The jack-shaft 163 is journalled in the casing 216 by means of bearings 234 and 235. The outer end of the jack-shaft 163 carries a pinion 236 which is adapted to engage a change gear 237 adjustably and removably mounted along a segment arm 238, rotatably mounted about the end of the jack-shaft 163. The segment arm 238 may be adjusted through a limited arc and clamped in adjusted position by means of a slot 239 and clamping nut arrangement 240. The change gear 237 carries a change gear pinion 241 which engages with an intermediate gear 242 rotatably carried by the rear wall of the casing 216. The intermediate gear 242 carries an intermediate pinion 243 which engages and drives a gear 244 secured to the shaft 233. In this way the jack-shaft 163 drives the shaft 233 which in turn drives the ring 217 through the intermediary of the worm 232 and worm gear 231. By properly selecting various sizes of change gear 237 and change gear pinion 241 a large number of definite speed relationships may be established between the jack-shaft 163 and the shaft 226.

It will be seen that the pitch of the winding wire 89 upon the side rods 8 and 9 is dependent upon the ratio between the speed at which the steel tape 213 draws the draw shaft 192 along the machine and the speed at which the arbor 22 rotates. Despite the fact that the change speed arrangement included in the drive of the steel tape 213 enables a relatively large number of changes in the above ratio to be made, nevertheless change speed gears are available commercially only in a predetermined number of sizes so that in absence of some additional adjustment the above ratio could be changed only by definite and discrete steps. In the design of electrical space discharge devices, it is often desirable to select a pitch for the grid which does not correspond exactly to the pitch which the usual change gear arrangement affords. Thus the limitation of machines using change gear arrangements has heretofore imposed a limitation upon the design of such space discharge tubes. The present machine affords a simple and inexpensive means for securing any desired pitch of the grid. As has been previously indicated, the speed at which the tape 213 travels is dependent upon the peripheral speed of the ring 217. With any given speed of the shaft 226, the peripheral speed of the ring 217 may be changed merely by changing the outside diameter of said ring. Thus, if a particular grid pitch is desired, the change gear which most closely results in such a pitch is selected. The exact outer diameter of the ring 217 to produce the exact desired pitch can then readily be determined. Since the ring 217 is of such a simple shape it can readily be turned out on a lathe in a minimum of time and with a minimum of operator skill. Once the ring 217 is made, it is assembled in the machine whereupon it causes the machine to produce the exact desired pitch of grid.

As will be described below, when a predetermined number of turns have been wound upon the side rods 8 and 9, the counters 16 and 17 complete a circuit which energizes the electromagnetic coil 64 to release the latch 60 causing the spring 59 to disengage the clutch 45. Under these conditions the drive shaft 18 is stopped and locked in a predetermined position which thus likewise holds the jack-shaft 163 stationary. This in turn stops the rotation of all the elements driven by the jack-shaft 163 including the shaft 226 carrying the clutch disc 222. To guard against improper setting or operation of the counters 16 and 17, the machine is provided with a safety limit switch 245 mounted upon the track 214 and having an actuating member 246 adapted to be engaged by the draw head 212 in the maximum desired limit of its travel. When the actuating member 256 is engaged by the draw head 212, the limit switch 245 is adapted to break the circuit between a pair of conductors 247 which are connected in a stop circuit which will be described below. This stop circuit acts to deenergize the entire system including the driving motor 27.

When the shaft 226 is stopped, as described above, the operator may cut off the sections of the side rods 8 and 9 upon which the winding wire 89 has been wound and by releasing the clamping link 201 the wound grid section may be removed from the clamp 191 and from the machine whereupon it may be cut up into the desired grid lengths. For the purpose of cutting off the wound grid sections of the side rods 8 and 9, the machine is provided (see Fig. 9) with a pair of knives 248 and 249 normally supported on opposite sides of the arbor 22 and spaced therefrom a sufficient distance to allow the wound side rods 8 and 9 to pass freely between them. The knives 248 and 249 are carried, respectively, by arms 250 and 251 pivoted by pivot points 252 and 253 (see Fig. 2) to the top of a block 254. A guide plate 255 also supported in the top of said block 254 engages intermediate points on the arms 250 and 251 to hold said arms down and prevent them from springing up out of position. Actuating links 256 and 257 are pivoted at one end to the arms 250 and 251, respectively. The other ends of said links are pivoted to an actuating disc 258 supported on a shaft rotatably mounted within the block 254. Secured to the disc 258 is a pinion 259 meshing with a gear 260 likewise carried by a shaft journalled in the block 254. The gear 260 is adapted to be rotated by an arm 261 provided with an actuating handle 262. Thus when the operator wishes to cut off the wound side rods 8 and 9 he rotates the arm 261 in a clockwise direction, as viewed in Fig. 9. Through the action of the gears 260 and 259 this in turn rotates the plate 258 in a counter-clockwise direction causing the links 256 and 257 to draw the arms 250 and 251 toward each other and in this way the knives 248 and 249 are forced into cutting engagement with the wound side rods 8 and 9, resulting in severing of said side rods.

After the wound side rods have been released from the machine, it is desirable that the draw shaft 192 be returned to its initial position so as to allow the clamp 191 to seize the next section of side rods 8 and 9 to be drawn through the machine. For this purpose a return steel tape 263 is secured to the lower face of the draw head 212. Said steel tape 263 extends toward the left of the machine, as viewed in Figs. 1, 17 and 18, over a guide roller 264 mounted on the side of the track 214 and then back again over another guide roller 265 likewise mounted on said track. The steel tape 264 has attached to its lower end a weight 266 which exerts the necessary force on said tape to force the draw shaft 192 back toward its initial position. In order to cushion the travel of the weight 266, it is formed as a plunger received within an air cylinder 267 supported on the supporting frame 2. The rate at which the weight 266 drops in the cylinder 267 is determined by an air release valve 268 at the bottom of the cylinder 267.

Before the tape 263 can pull the draw shaft 192 back towards its initial position, the clutch disc 222 (Figs. 19, 20) must be released from the inner surface of the ring 217. For this purpose a plurality of disengaging pins 269 extend radially through said clutch disc 222 and through the shaft 226 into a central bore therethrough where they come into engagement with a rod 270 provided with a reduced section and an enlarged section connected by a disengaging clutch section 271. When the reduced section of the rod 270 is held adjacent the inner ends of the pins 269, said pins are retracted to a position which permits the rollers 225 to bind the clutch disc 222 to the ring 217. If, however, the rod 270 is moved so as to force the cam section 271 between the inner ends of the pins 269, then said pins will be forced outwardly and will move the rollers 225 out of locking engagement with the inner surface of the ring 217, thus permitting the clutch disc 222 to rotate freely within said ring. Normally the rod 270 is held with its reduced section adjacent the inner ends of the pins 269 by means of a biasing spring 272 received within a recess in the block 229 and engaging the inner surface of a piston head 273 formed on the rod 270. The piston head 273 slides in a cylinder 274 received within the block 229. Air or other fluid pressure is adapted to be introduced against the outer surface of the piston head 273 by means of a fluid pressure pipe 275 feeding through a cylinder head 276 secured to a face plate 277 on the casing 216, said face plate also carrying the block 229. The cylinder head 276 closes the outer end of the cylinder 273. Fluid pressure is introduced into the pipe 275 by means of a suitable fitting 278 actuated by a foot lever 279 under the control of the operator. Thus, when the operator desires to return the draw shaft 192 to its initial position he depresses the foot lever 279 emitting fluid pressure through the pipe 275 to the piston head 273 which releases the clutch, as described above. Thereupon the weight 266 pulls the draw shaft 192 towards its initial position, as described above. In order that the draw shaft 192 shall stop in a predetermined position, the face plate 277 carries a stop 277' and the plate 219 carries a cooperating stop 219'. When the desired limit of travel is reached the stop 219' engages the stop 277' and thus further travel of the draw shaft 192 is prevented. When the predetermined position is reached the operator releases the foot lever 279 which likewise releases the fluid pressure from the pipe 275 permitting the clutch 222—217 to be reset into a condition whereby the clutch plate 222 may again drive the ring 217.

*Electrical circuit*

Figure 22:
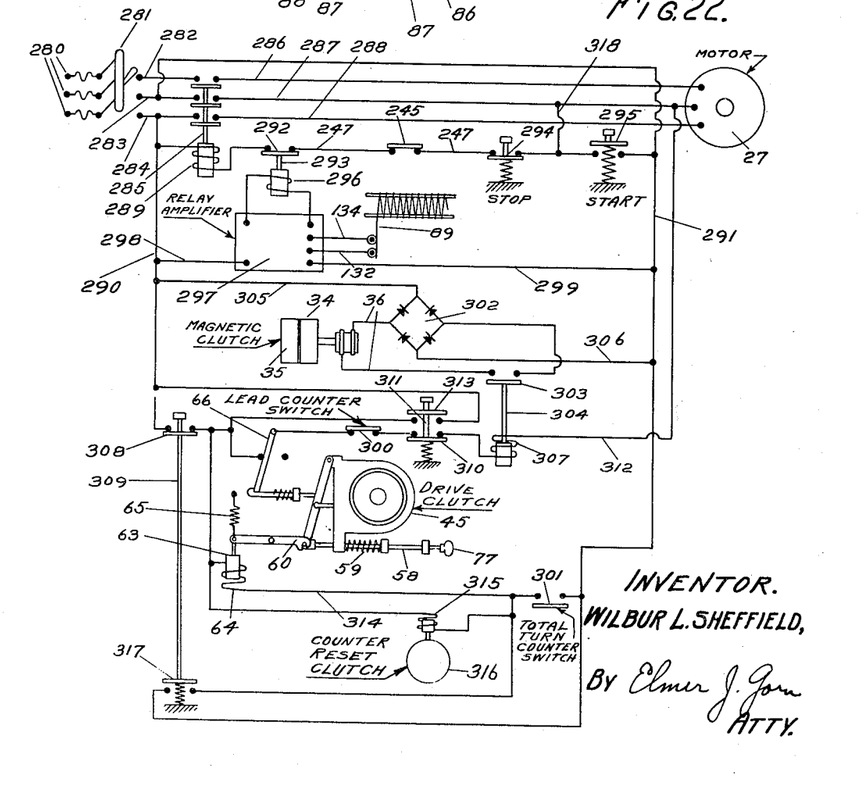
Fig. 22 is a diagram of the electrical circuits of the machine.

The electrical circuit of the machine is illustrated in Fig. 22. A three-phase supply line 280 is adapted to be connected by means of a switch 281 to three local supply lines 282, 283 and 284. A relay 285 is adapted to connect said local supply lines to three motor feed lines 286, 287 and 288 leading directly to the motor 27 so that when said relay 285 is actuated the motor 27 is set in rotation. The relay 285 is provided with an actuating coil 289, the circuit for which extends between the control circuit lines 290 and 291 connected directly to the local supply lines 283 and 284. The energizing circuit for the coil 289 extends from the line 290 through the coil 289, contacts 292 of a cut-off relay 293, a conductor 247 leading through the unit switch 245, a stop switch 294 and a starting switch 295 to the control circuit line 291. Thus under normal conditions when the starting switch 295 is closed, the relay 285 will be actuated to start the motor 27. The cut-off relay 293 is closed only if the winding wire 89 is in position and unbroken. The actuating coil 296 for the relay 293 is supplied from the output of a relay amplifier 297 supplied with power by leads 298 and 299 connected respectively to the lines 290 and 291. The conductors 132 and 134 which are connected together by the winding wire 89 in its normal unbroken position are connected to the relay amplifier 297 as the control members therefor. The relay 297 is of a well known type in which the actuating coil 296 is supplied with current only if the circuit is completed through the winding wire 89.

The lead counter 16 is provided with a switch 300 which in the normal position of said lead counter is maintained closed. The total turn counter 17 is provided with a switch 301 which is normally maintained open. The total turn counter 17 is adapted to have set up in it the total number of turns desired to be wound on the machine during a single operation while the lead counter 16 is adapted to have set up therein a predetermined number of turns less than that set up in the total turn counter. When the lead counter reaches the number set up therein, the switch 300 opens, and when the total turn counter reaches the number set up therein, the switch 301 closes.

The magnetic clutch 34—35 is adapted to be energized through its leads 36 connected to the output of a rectifier 302, by means of the contact 303 of a relay 304. The rectifier 302 is supplied with power through lines 305, 306 connected respectively to the control circuit lines 290, 291. The energizing circuit for the actuating coil 307 of the relay 304 extends from the line 290 through contact 308 of a push button switch 309, micro-switch 66 in its closed position, lead counter switch 300, the normally closed contact 310 of a push button switch 311, actuating coil 307 and conductor 312 to the motor feed line 287. When this circuit is completed, the relay 304 is actuated to energize the magnetic clutch 34—35 so as to drive the machine at its normally high speed. For a purpose to be described below the normally closed contact 308 of the push button switch 309 has connected and parallel therewith a normally open contact 313 of the push button switch 311.

The actuating circuit for the coil 64, which disengages the drive clutch 45 and stops the machine within a small fraction of a revolution, extends from the line 290, the contact 308, the coil 64, conductor 314 and the switch 301 of the total turn counter to the other control circuit line 291. Thus under normal conditions when the switch 301 closes, the coil 64 is actuated to disengage the drive clutch 45 and stop the rotation of the machine.

In parallel with the coil 64 is connected the coil 315 which as indicated in Fig. 2 is mounted on the counting mechanism to actuate a counter reset clutch 316 so as to connect the counter reset shaft to the counting mechanism for the purpose of resetting the counters 16 and 17 to zero. The details of this arrangement are described and claimed in my copending application, Serial No. 536,190 referred to above.

For purposes to be described below a normally open contact 317 on the push button switch 309 is connected in parallel with the total turn counter switch 301.

Operation

After the various adjustments which determine the diameter, the pitch and the relationship between the swaged and loose turns on the grid have been made, the side rods 8 and 9 are taken from the spools 6 and 7 and threaded along the two sides of the arbor 22. The clamp 191 is then closed on the outer ends of the side rods. The winding wire 89 is led from the spool 108 over the various guide rollers, over the face of the lead-in plate 113, and a few turns thereof are wound by hand around the side rods 8 and 9. Assuming the switch 281 to have been closed, the threading of the winding wire 89 into position completes the circuit 132—134 which causes the amplifier 297 to energize the relay 293 thus closing the contacts 292 so as to prepare the circuit for the relay 285. The machine is now ready to start and the operator normally depresses the starting switch 295 thus completing the energizing circuit for the relay 285 which closes and starts the motor 27 in operation. The relay 285 establishes a lock-in circuit for its actuating coil 289 by way of a conductor 318 which establishes a by-pass circuit around the switch 295 back to the conductor 283. Thus the switch 295 may be released and the motor continues to rotate. Before the operation of the motor is initiated, the clutch 45 is in its disengaged position with the rod 58 in its outer position. Thus the rotation of the motor 27 will transmit its rotation only as far as the sprocket 40 and its cam 46. Also due to the fact that the rod 58 is in its outer position, the micro-switch 66 will have been moved to its open position thus interrupting the circuit for the actuating coil 307 of the relay 304 so that the magnetic clutch 34—35 is deenergized. During this preliminary operation, therefore, the motor 27 will drive the sprocket 40 and its cam 46 at the initial low speed.

When the operator observes that the action is proceeding properly, the starting handle 77 is pushed inwardly until the latch 60 engages the inner end of the rod 58 and holds said rod in its operating position. This movement of the rod 68 causes the clutch 45 to be actuated so as to couple the drive shaft 18 to the sprocket 40. It will be noted that the actuation of the clutch 45 occurs at low speed thus avoiding any undue shock on the machine. The operation of the clutch 45 sets the driving plate 49 in rotation causing its cam projection 71 to force the rod 70 outwardly thus moving the micro-switch 66 into its closed position. Closing of the micro-switch 66 completes the energizing circuit for the coil 37 of the relay 304. Thus this relay closes the contacts 303 which energizes the magnetic clutch causing the motor 27 to drive the machine at its normally high speed.

The drive shaft 18 rotates the arbor 22 between the cutter 90 and the swage 135 thus producing the cutting and swaging action already described. The drive shaft 18 also drives the jack shaft 163 which in turn drives the cam shaft 158 thus controlling the relationship between the swaged and the loose turns on the grid. The jack shaft 163 also drives the shaft 226 in the rear casing, causing the ring 217 to wind up the steel tape 213 thus pulling the draw shaft 192 which in turn draws the side rods 8 and 9 away from the arbor 22 as the winding wire 89 is wound thereon. The jack shaft also rotates the draw shaft 192 through the mechanism in the center casing 166 so as to avoid twisting of the side rods 8 and 9.

When the number of turns as predetermined by the setting of the lead counter 16 is reached, the contact 300 opens. This interrupts the circuit for the actuating coil 307 of the clutch relay 304 thus deenergizing the magnetic clutch 34—35. At this point, therefore, the motor 27 drives the machine at its low speed. The last few turns on the grid, therefore, will wind at this low speed until the total number of turns as predetermined by the setting of the total turn counter 17 has been reached. At this point the switch 301 closes and energizes the circuit for the coil 64. The energization of the coil 64 releases the latch 60 and causes the spring 59 to move the rod 58, the link 57, and the stop rod 55 into position where the shoulder 56 disengages the pawl 47 from the cam 46 which in turn causes the drive shaft to be locked in its stopped position by virtue of the one-way clutch arrangement 74—76. It will be noted that this stopping and locking action occurs at low speed which avoids any undue shock on the machine and permits accurate stoppage of said machine in exactly centered position. Such an arrangement makes for high accuracy in the winding of the grid.

At the same time that the coil 64 is energized, the coil 315 is energized causing the reset shaft 44 to reset the counter to zero preparatory to the next winding operation. When the resetting action starts, the switch 301 opens and shortly thereafter the switch 300 closes. However, this does not reenergize the relay 304 and cause the motor to drive the mechanism at high speed because the circuit for actuating coil 307 of said relay 304 is interrupted at the switch 66 which is maintained open until after the clutch 45 has been reengaged and the operation restarted on the next winding cycle as already described above.

Thereupon the operator cuts off the wound side rods 8 and 9 by the knives 248 and 249, releases the clamp 191 and removes the wound grids from the machine all as described above. Thereupon by depressing the foot lever 279, the draw shaft 192 is returned to its initial position preparatory to the start of the next winding cycle. Thereupon the operator may restart the cycle in the manner as described above.

If for any reason during normal winding it is desired to cause the operation to proceed at low speed, the switch 311 may be depressed. This causes the contact 310 to interrupt the circuit for the actuating coil 307 which thus opens the relay 304 and its contact 303. This in turn deenergizes the magnetic clutch 34—35 so that the operation proceeds at low speed. If the switch 311 is depressed to such an extent as to close the contact 313, no additional action occurs since the contact 313 is normally short-circuited by the contact 308 on the switch 309. If instead of depressing the switch 311, the operator depresses the switch 309, the contact 308 will interrupt the circuit for the actuating coil 307 of the relay 304. This likewise causes the operation of the machine at low speed. If the switch 309 is depressed far enough to close the contacts 317 across the total turn counter switch 301, stoppage of the machine due to energization of the coil 64 does not occur because the energizing circuit for said coil 64 has been interrupted at the contact 308.

Under some conditions the operator may desire to stop the rotation of the machine before the total number of turns have been wound. For this purpose the operator first depresses the switch 311 so as to slow the machine down to its slow speed operation. Then, while keeping the switch 311 depressed, the operator also depresses the switch 309. This causes the contact 317 to by-pass the total turn counter switch 301 so that a circuit for the stopping coil 64 is established from the line 291 through the contact 317, the coil 64, and the contact 313, to the line 290. Thus in order to stop and lock the machine the operator must utilize both hands. Furthermore, the switches 309 and 311 are placed sufficiently far apart so as to prevent the operator from depressing both switches with one hand. This insures that the operator will first slow the machine down before an attempt is made to stop and lock the machine in its centered position.

If for some reason the operator wishes to stop the entire machine, the switch 294 is depressed. This interrupts the holding circuit for the relay 285 which drops out and deenergizes the motor 27. As the motor 27 is coasting to a standstill, the circuit for the actuating coil 307 of the relay 304 will have been interrupted between the conductors 283 and 287 so that any driving action of the motor during this period will be at slow speed. A similar stopping action occurs automatically if the winding wire 89 should break since such breaking would cause the relay 293 to drop out and interrupt the holding circuit for the relay 285 at the contacts 292. Even though the circuit for the motor is interrupted by the relay 285, it may still be desirable to actuate the coil 64 so as to disengage the clutch 45. For this purpose the control circuit lines 290 and 291 are energized ahead of the contacts of the relay 285 so that actuation of said relay does not deenergize said control circuit.

If the counter switches do not stop the winding by the time the draw head 212 reaches the limit switch 245, this switch will open and likewise stop all further operation. This constitutes an additional safety feature.

Of course it is to be understood that this invention is not limited to the particular details as described above as many equivalents will suggest themselves to those skilled in the art. It is accordingly desired that the appended claims be given a broad interpretation commensurate with the scope of the invention within the art.

What is claimed is:

1. In a grid-making machine, a grid-forming mechanism adapted to wind and secure a winding wire around an elongated side rod wire, feeding means for advancing said side rod through said machine, and means for moving said feeding means along said machine, said last-named means comprising a flexible strip secured at one end to said feeding means, winding means comprising a member having a simple circular peripheral surface upon which said strip is wound from its other end to produce said motion, said winding means being mounted on rotatable driving means and being readily detachable therefrom whereby any desired predetermined diameter winding means may be substituted readily in said machine.

2. In a grid-making machine, a grid-forming mechanism adapted to wind and secure a winding wire around an elongated side rod wire, feeding means for advancing said side rod through said machine, and means for moving said feeding means along said machine, said last-named means comprising a flexible strip secured at one end to said feeding means, winding means comprising a member having a simple circular peripheral surface upon which said strip is wound from its other end to produce said motion, said winding means being mounted on rotatable driving means, and constant speed power driving means connected to said rotatable driving means through a change speed gearing device whereby said rotatable driving means may be driven at predetermined increments of speed.

3. In a grid-making machine, a grid-forming mechanism adapted to wind and secure a winding wire around an elongated side rod wire, feeding means for advancing said side rod through said machine, and means for moving said feeding means along said machine, said last-named means comprising a flexible strip secured at one end to said feeding means, winding means comprising a member having a simple circular peripheral surface upon which said strip is wound from its other end to produce said motion, said winding means being mounted on rotatable driving means, and constant speed power driving means connected to said rotatable driving means through a change speed gearing device whereby said rotatable driving means may be driven at predetermined increments of speed, said winding means being readily detachable from said rotatable driving means whereby any desired predetermined diameter of winding means may be substituted readily in said machine.

4. In a grid-making machine, a grid-forming mechanism adapted to wind and secure a winding wire around an elongated side rod wire, feeding means for advancing said side rod through said machine, driving means for moving said feeding means forward along said machine, a flexible strip secured at one end to said feeding means, a weight connected to said strip at its opposite end whereby said weight tends to pull said feeding means back towards its initial position, clutch means interposed between said driving means and said feeding means, and means for releasing said clutch means whereby said weight automatically returns said feeding means to its initial position.

5. In a grid-making machine, a grid-forming mechanism adapted to wind and secure a winding wire around an elongated side rod wire, feeding means for advancing said side rod through said machine, means for moving said feeding means along said machine, said last-named means comprising a flexible strip secured at one end to said feeding means, winding means comprising a member having a simple circular peripheral surface upon which said strip is wound from its other end to produce said motion, said winding means being mounted on rotatable driving means, power driving means connected to said rotatable driving means, a second flexible strip secured at one end to said feeding means, a weight connected to said second strip at its opposite end whereby said weight tends to pull said feeding means back towards its initial position, clutch means interposed between said power driving means and said rotatable driving means, and means for releasing said clutch means whereby said weight automatically returns said feeding means to its initial position.

6. In a grid-making machine, a grid-forming mechanism adapted to wind and secure a winding wire around an elongated side rod wire, feeding means for advancing said side rod through said machine, driving means for moving said feeding means forward along said machine, power driving means for driving said grid-forming mechanism and said driving means, a clutch interposed between said power driving means and said grid-forming mechanism and said driving means, said power driving means normally operating at a relatively high speed during the grid-forming operation, means responsive to the winding of a predetermined number of turns of said winding wire on said side rod for reducing the speed of said power driving means to a relatively low value, and means responsive to a higher predetermined number of said turns for disengaging said clutch and for locking said grid-forming mechanism in a stationary position.

7. In a grid-making machine, a grid-forming mechanism adapted to wind and secure a winding wire around an elongated side rod wire, feeding means for advancing said side rod through said machine, driving means for moving said feeding means forward along said machine, power driving means for driving said grid-forming mechanism and said driving means, a clutch interposed between said power driving means and said grid-forming mechanism and said driving means, said power driving means normally operating at a relatively high speed during the grid-forming operation, means responsive to the winding of a predetermined number of turns of said winding wire on said side rod for reducing the speed of said power driving means to a relatively low value, and means responsive to a higher predetermined number of said turns for disengaging said clutch and for locking said grid-forming mechanism in a predetermined position of orientation.

8. In a grid making machine, a grid-forming mechanism adapted to wind and secure a winding wire around an elongated side rod wire, feeding means for advancing said side rod through said machine, driving means for moving said feeding means forward along said machine, biasing means tending to move said feeding means backward along said machine towards its initial position, clutch means interposed between said driving means and said feeding means, and means for releasing said clutch means whereby said biasing means automatically returns said feeding means to its initial position.

WILBUR L. SHEFFIELD.

REFERENCES CITED

The following references are of record in the file of this patent:

UNITED STATES PATENTS

| Number | Name | Date |
|---|---|---|
| 293,176 | Johnston | Feb. 2, 1884 |
| 423,088 | Sherman | Mar. 11, 1890 |
| 561,579 | Gare | Mar. 11, 1896 |
| 1,113,779 | Greenleaf | Oct. 13, 1914 |
| 1,399,384 | Heilman | Dec. 6, 1921 |
| 1,464,505 | Fumagalli et al. | Aug. 14, 1923 |
| 1,583,530 | De Lavaud | May 4, 1926 |
| 1,585,905 | Madden et al. | May 25, 1926 |
| 1,814,770 | Schenk et al. | July 14, 1931 |
| 1,874,575 | Morick et al. | Aug. 30, 1932 |
| 1,897,460 | Anderson et al. | Feb. 14, 1933 |
| 1,942,069 | Setoguchi et al. | Jan. 2, 1934 |
| 1,970,599 | Franke | Aug. 21, 1934 |
| 1,994,307 | Flaws, Jr. | Mar. 12, 1935 |
| 2,096,605 | Blount | Oct. 19, 1937 |
| 2,181,288 | Washburn | Nov. 28, 1939 |
| 2,188,906 | Lackey | Feb. 6, 1940 |
| 2,247,713 | Peterson et al. | July 1, 1941 |
| 2,292,988 | Bloomfield et al. | Aug. 11, 1942 |
| 2,373,427 | Stickney | Apr. 10, 1945 |